United States Patent
Boyer

(10) Patent No.: US 6,282,315 B1
(45) Date of Patent: Aug. 28, 2001

(54) SYSTEM FOR ENTERING HANDWRITTEN DATA INTO COMPUTER GENERATED FORMS

(75) Inventor: Monty L. Boyer, Saratoga, CA (US)

(73) Assignee: Samsung Electronics, Ltd., Suwon (KR)

( * ) Notice: Subject to any disclaimer, the term of this patent is extended or adjusted under 35 U.S.C. 154(b) by 0 days.

(21) Appl. No.: 09/376,222

(22) Filed: Jul. 2, 1997

Related U.S. Application Data

(63) Continuation of application No. 08/541,659, filed on Oct. 10, 1995, now abandoned, which is a continuation of application No. 08/179,991, filed on Jan. 10, 1994, now Pat. No. 5,459,796, which is a continuation of application No. 07/602,431, filed on Oct. 22, 1990, now abandoned.

(51) Int. Cl.⁷ ..................................................... G06K 9/34
(52) U.S. Cl. ........................................... 382/177; 382/179
(58) Field of Search .................................. 382/179, 185, 382/187, 312, 313, 182, 314, 315, 175; 379/368, 396; 345/173

(56) References Cited

U.S. PATENT DOCUMENTS

| | | | |
|---|---|---|---|
| 3,872,433 * | 3/1975 | Holmes et al. | 382/175 |
| 4,578,811 * | 3/1986 | Inagaki | 382/182 |
| 4,654,873 * | 3/1987 | Fujisawa et al. | 382/178 |
| 4,725,694 * | 2/1988 | Auer et al. | 345/173 |
| 4,727,588 * | 2/1988 | Fox et al. | 345/173 |
| 4,752,965 * | 6/1988 | Dunkley et al. | 382/119 |
| 4,758,979 * | 7/1988 | Chiao-Yueh | 382/185 |
| 4,763,252 * | 8/1988 | Rose | 345/168 |
| 4,763,356 * | 8/1988 | Day, Jr. et al. | 379/368 |
| 4,860,372 * | 8/1989 | Kuzunuki et al. | 382/189 |
| 4,899,292 * | 2/1990 | Montagna et al. | 395/147 |
| 4,953,225 * | 8/1990 | Togawa et al. | 382/179 |
| 5,001,697 * | 3/1991 | Torres | 395/139 |
| 5,026,953 * | 6/1991 | Hsu | 178/18.01 |
| 5,065,438 * | 11/1991 | Hirose et al. | 382/202 |
| 5,133,076 | 7/1992 | Hawkins et al. | |
| 5,157,737 * | 10/1992 | Sklarew | 382/315 |
| 5,276,794 | 1/1994 | Lamb, Jr. | |

* cited by examiner

Primary Examiner—Joseph Mancuso
Assistant Examiner—Ali Bayat
(74) Attorney, Agent, or Firm—Knobbe, Martens, Olson & Bear, LLP

(57) ABSTRACT

A method for entering data into a computer generated form including field areas of preselected height and width includes the steps of converting handwritten characters of arbitrary height which may be greater than the preselected height formed on the screen to computer generated characters and displaying the computer generated characters within a field area. Additionally, handwritten characters to be entered into several field areas are grouped, converted, and displayed in selected field areas.

28 Claims, 9 Drawing Sheets

FIG. 1. PRIOR ART

JOANN FABRICS

SEWING MACHINE ORDER FORM

CUSTOMER NAME: SMITH, FRED

PRODUCT DESCRIPTION:

QUANTITY: 100

PRICE: 6.50

PAYMENT:
○ CASH
○ CHECK
○ VISA
○ MASTERCARD

MONTH
JANUARY
FEBRUARY
MARCH
APRIL

THANK YOU FOR YOUR BUSINESS!

CANCEL    DONE

SYSTEM FOR ENTERING HANDWRITTEN DATA INTO COMPUTER GENERATED FORMS

This is a Continuation of application Ser. No. 08/541,659, filed Oct. 10, 1995, now abandoned; which is a continuation of application Ser. No. 08/179,991 filed Jan. 10, 1994, which is now U.S. Pat. No. 5,459,796, issued Oct. 17, 1995, which is a continuation of application Ser. No. 07/602,431, filed Oct. 22, 1990, now abandoned.

BACKGROUND OF THE INVENTION

The invention relates generally to computer data entry systems and more particularly to systems for entering handwritten data into a computer.

Systems that utilize a computer for displaying forms and entering data into fields in the form are known. A typical computer generated form is depicted in FIG. 1. In FIG. 1 a form 10 is displayed on a computer screen 12. A pointer device 14 is used to make marks, such as editing commands or handwritten alphanumeric characters, on the screen 10. In some systems "electronic ink" is concurrently displayed on the screen 12 as a mark is made by the pointer 14.

The form 10 includes field areas 16 and computer generated alphanumeric characters forming text entries. Other features such as control buttons 18 and lists 20 may also be included in a form. The field areas 16 and associated text entries convey to a user that a certain type of information is to be entered into a specific location of the form.

For example, the displayed text "Customer Name" and adjacent displayed field area 16a convey to the user that the alphabetic characters spelling out the customers name should be entered into the field 16a. Similarly, the customer knows that the numeric symbols of the number of products is to be entered into the field area 16b.

Figure 1:
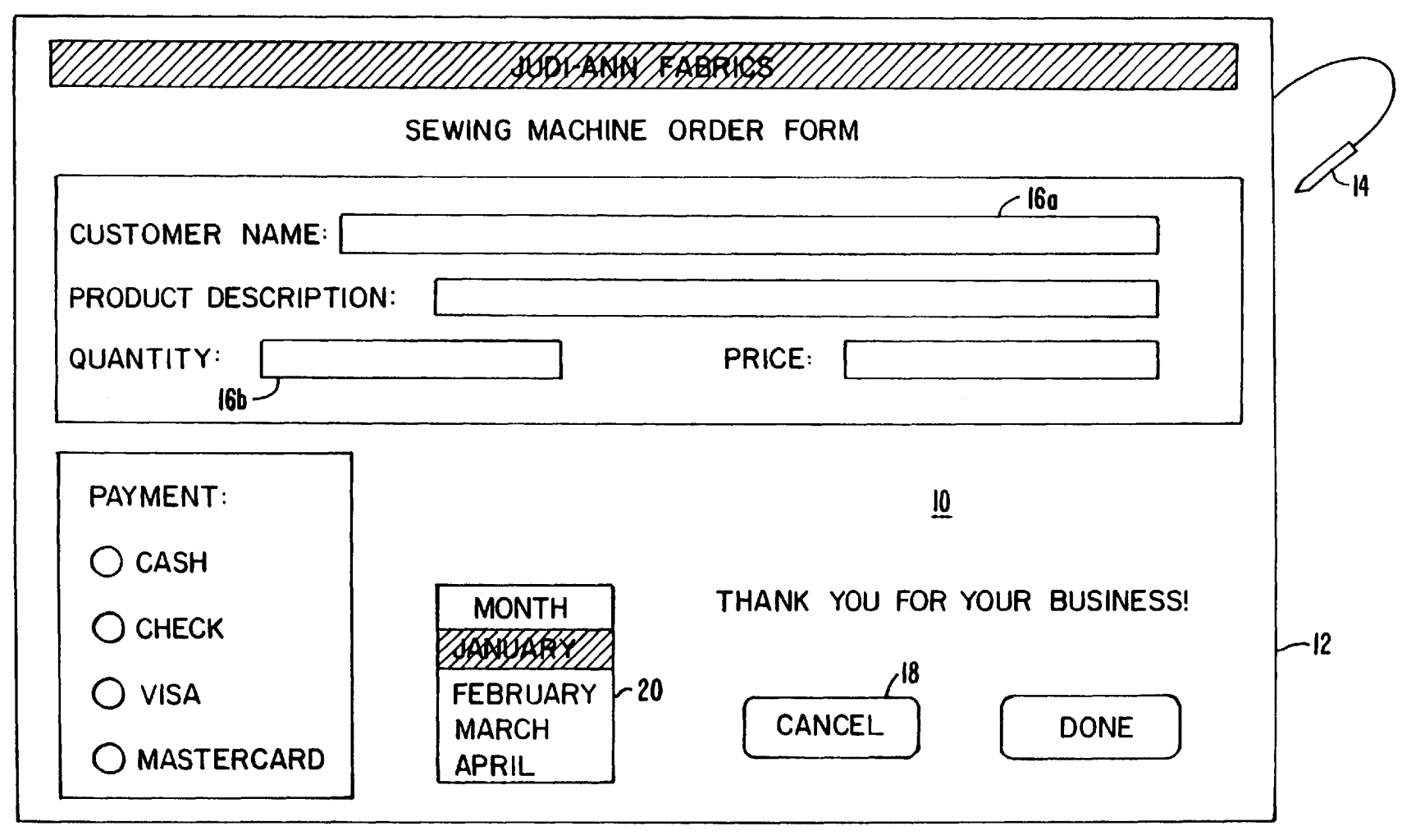

FIG. 1A depicts a hand-held notebook style computer that can be utilized in the field as a substitute for a clipboard. The form 10 is displayed on the screen 12 and the user fill in the form utilizing the pointer 14. The details of the architecture and operation of this computer are disclosed in a commonly-assigned patent application entitled HAND HELD NOTEBOOK STYLE COMPUTER, S/N 365,147, which is hereby incorporated by reference.

If the displayed form were printed on paper, the user would simply write the required information in the correct field area utilizing a pen or pencil. If the letters did not quite fit in field areas there would be no effect on the utility of the form to convey or store the required information. Additionally, the user would not be required to fill in the field areas in any particular order or time sequence.

Ideally, the computer data entry system would emulate the entry of information on a paper form. However, existing systems have not yet achieved such ease of entry. The display of the form 10 on the screen 12 and the recognition of handwritten characters and editing symbols is performed by a computer program. One function of the computer program is to convert the handwritten information entered into a field area into digital data stored in the computer memory for later use. Once the handwritten characters are converted into digital form, the characters are recognized by the computer program, and computer generated characters corresponding to the handwritten characters are displayed in the field and stored in the computer memory.

In addition to recognizing the handwritten characters the computer program must determine into which field the user intends to enter information. In some systems the program displays information indicating which field is ready to input data. For example, a field may be displayed in reverse video. In existing systems, this conversion is initiated when the user touches a special control button 18 with the pointer 14.

In another type of system the user must write characters that fit within the boundaries of the field. However, this system has several drawbacks. It is difficult to write and recognize small characters written on the screen 12. Accordingly, the field areas 16 must be made large enough to accommodate handwritten characters that are easily recognizable. Large field areas, on the other hand, restrict the amount of information that can be entered into a displayed form 10 and decrease the efficiency of the system.

Another type of system displays the fields in a small format and then pops-up a larger field for the entry of handwritten data. However, this system is slower because it requires extra steps and also allows entry into only one field at a time.

Another known method for entering data into a computer generated form is to utilize pop-up keyboards. Generally, the keyboards pop-up in a predetermined sequence or in response to utilizing a control mechanism. The keys are used to enter computer generated characters into a field area.

Accordingly, although the computerized entry of handwritten data into forms is a great advance in user friendly computer interface technology, improvements are required to emulate the entry of data onto paper forms.

SUMMARY OF THE INVENTION

The present invention is a method for filling in a computer generated form that is similar to the method for a filling in a paper form. The user may write handwritten characters of arbitrary height which may be greater than the height of the field areas of the form, fill in the field areas in any particular order, or utilize a control button or other control mechanism to invoke conversion to computer generated characters.

According to one aspect of the invention, the user writes handwritten characters on the screen and the computer writes electronic ink so that the characters are visible to the user. If the pen is held up for longer than a predetermined time interval a time-out occurs and the handwritten characters are grouped according to the associated fields they are nearest to. Each group of handwritten characters are converted to computer generated characters and displayed within the associated field area.

Other advantages and features of the invention will become apparent in view of the drawings and following detailed description.

BRIEF DESCRIPTION OF THE DRAWINGS

FIG. 1 is schematic diagram of a computer generated form;

FIG. 2B is schematic diagram of a computer generated form displaying computer generated characters corresponding to the handwritten characters displayed in FIG. 2A;

FIGS. 4A and 4B are schematic diagrams of computer generated forms including pop-up keyboards;

DETAILED DESCRIPTION OF THE PREFERRED EMBODIMENTS

The present invention is a computer data entry system that emulates the ease of entering handwritten information on a printed form. The method of entering data will be described with reference to FIGS. 2A–2B.

Figure 1A:
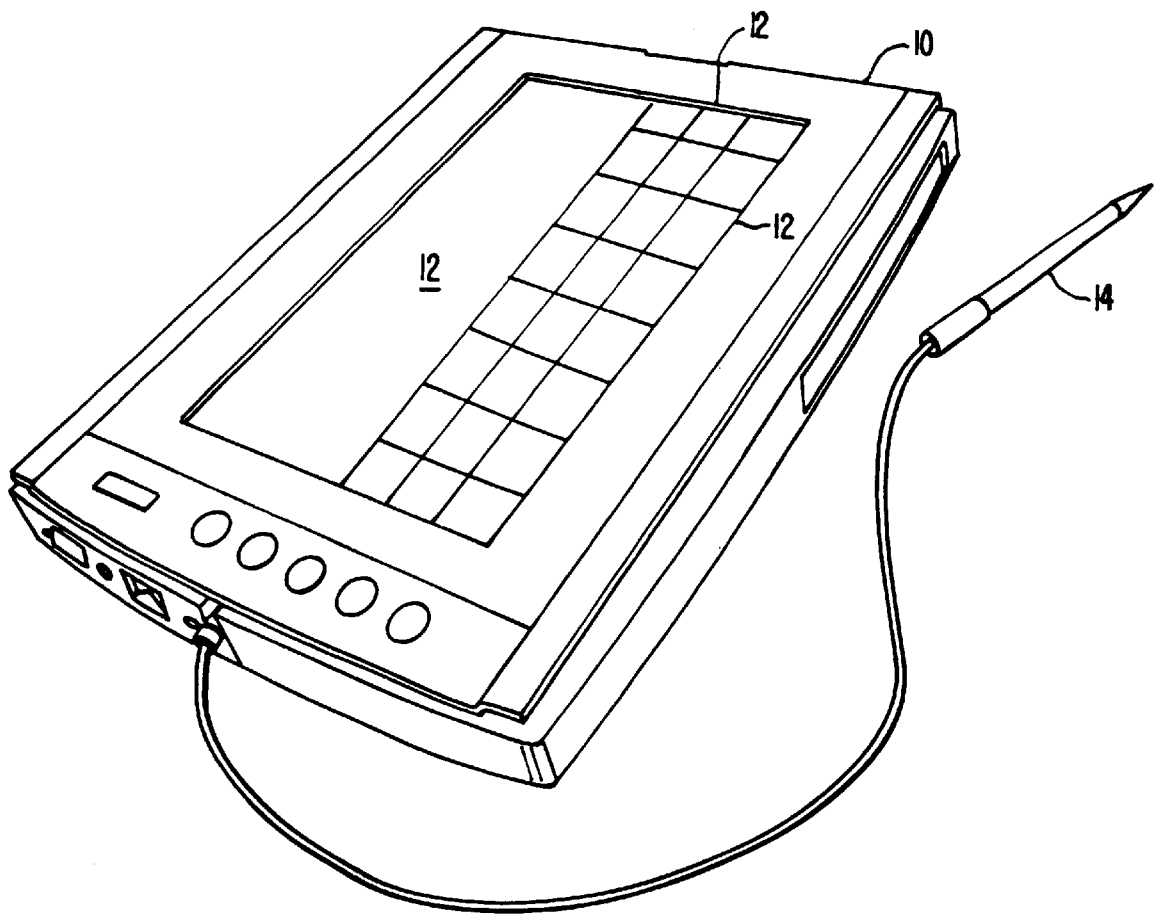
FIG. 1A is a perspective view of a hand-held notebook style computer.
Figure 2A:
FIG. 2A is schematic diagram of a computer generated form displaying electronic ink of handwritten characters formed according to a preferred embodiment of the invention.

In FIG. 2A the user has written the customer name, the quantity, and the price over the appropriate field areas 16a, 16p and 16q of the form 10. There is no restriction on the order of entry, no limitations on the number of fields areas over which data can be entered, or any requirement that the handwritten characters be confined within the boundaries of the field areas 16a, 16p and 16q. Accordingly, the system emulates the ease of entry of data onto a paper form.

The conversion of the handwritten characters to computer generated "typed" characters is invoked by holding the pen up for a predetermined timeout period. The computer generated "typed" characters are displayed in the appropriate fields as depicted in FIG. 2B. Thus, the user in not required to utilize a control bottom or other control mechanism to invoke conversion.

A computer program for implementing the method of filling in a displayed form described with reference to FIGS. 2A–2B will now be described with reference to the flow-chart of FIG. 3.

Figure 3:
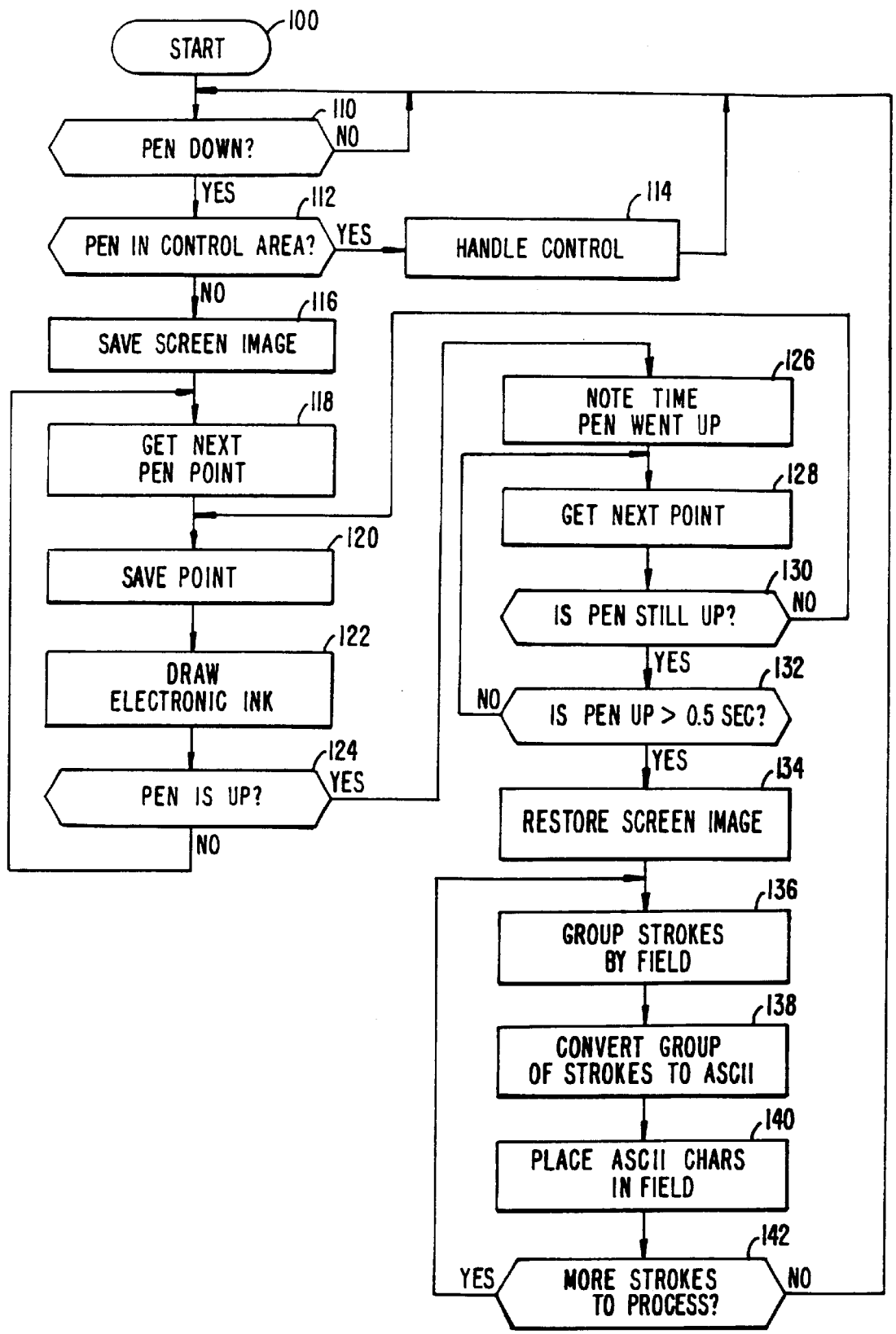
FIG. 3 is a flow-chart illustrating a computer program for implementing a method for filling in a computer generated form.

Referring to FIG. 3, the program continually tests 110 whether the pen has come down to touch the screen. When the pen comes down it is first determined 112 whether the pen is in a control area and, if so, the indicated control function is handled 114 and the program goes back to testing 110 whether the pen is down.

If the pen comes down and is not in a control area then the image currently displayed on the screen is saved 116 in memory. The program then repeatedly gets 118 the next point disposed under the moving pen, saves 120 the coordinates of the point in memory, and draws 120 electronic ink of the display at the coordinates of the point until pen comes up. The program tests 124 whether the pen comes up after the electronic ink is drawn 122 on the screen. The pen coming up indicates the end of a stroke.

Also, when the pen comes up the program determines whether the user has finished data entry and conversion of the handwritten character to computer generated "typed" characters is to be implemented.

This determination is implemented as follows: if it is determined 124 that the pen is up the time the pen went up is noted. In practice, a timer may be triggered. The program then attempts to get 128 the next point indicated by the pen. If the pen is down then the program implements steps 120–124 to collect the points and display the electronic ink for the next stroke. If the pen is still up then it is determined whether the timer indicates whether the pen has been up for a predetermined time period, e.g., greater than 0.5 sec. If not, the program keeps trying to get 128 the next point starting the next stroke until it is determined 132 that the pen has been up more than 0.5 sec.

If the pen is up more than 0.5 sec. then a time-out occurs and the process of converting the handwritten characters to computer generated, e.g., ASCII characters, is invoked. First, the saved screen image is restored 134 by exchanging the screen image containing the electronic ink indicating the coordinates of the strokes with the screen image previously saved.

The strokes stored in the restored screen image are then formed into groups associated with the field areas 16a, 16p and 16q of the form. First, the strokes having coordinates disposed nearest a first field area are formed 136 into a first group. The first group of handwritten strokes are then converted 138 into ASCII characters and the ASCII characters are placed 140 into the first field area. If it is determined 142 that there are still more strokes to process then a second group of strokes is formed 136, converted 138, and placed in a second field area. This process of conversion continues until it is determined 142 that there are no more strokes to process. The program then returns to the step of testing 110 whether the pen has come down on the screen.

In the example illustrated in FIGS. 2A and 2B, the user fills in the field areas 16a, 16p and 16q of the form in any order. Note in FIG. 2A that the handwritten characters need not be written inside the field areas 16a, 16p and 16q. Accordingly, from the users point of view, utilizing the computer generated field is equivalent to using a paper form.

When the user stops writing the computer detects time-out and the characters are grouped by field, converted to ASCII characters, and displayed in the appropriate fields as depicted in FIG. 2B.

Figure 4A:
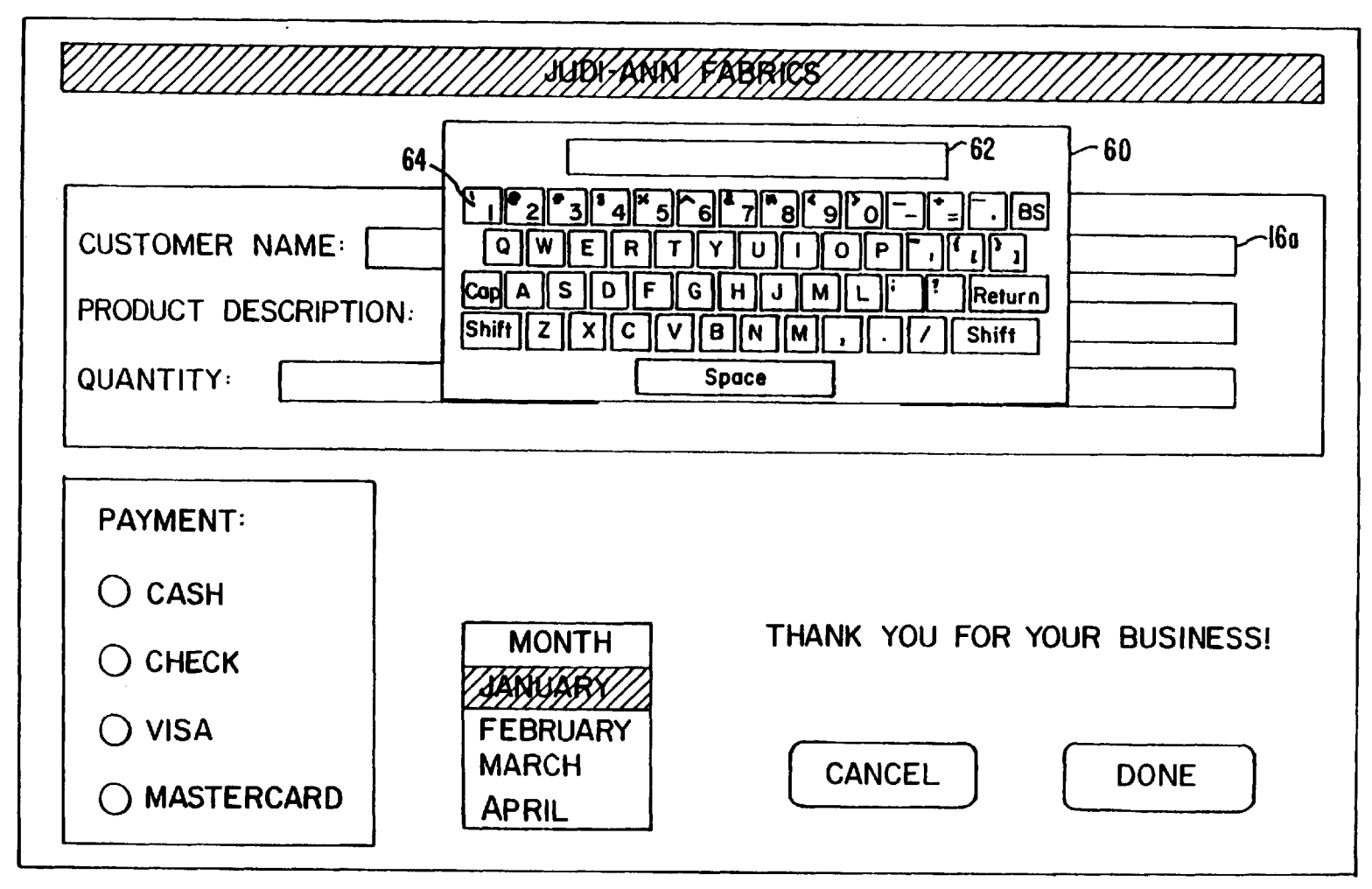
Figure 4B:
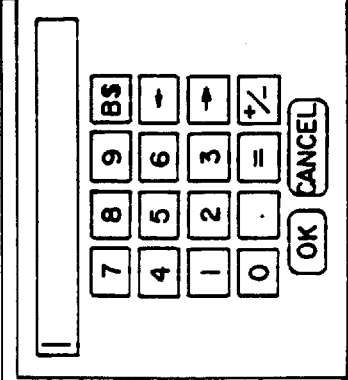

An alternative system for entering information into a computer generated from is depicted in FIGS. 4A and 4B. In FIG. 4A, an example of a pop-up keyboard 60 for entering alphanumeric information into a field area 16a, 16p and 16q is depicted. The pop-up keyboard 60 is displayed when a selected field area 16s, in this example the "Customer Name" field area, 16a is taped twice with the pointer. Accordingly, the present system allows the user full flexibility to pop-up a keyboard for any field area without utilizing a control button or other control mechanism.

The pop-up keyboard 60 includes a display area 62 and key areas 64 that display alphanumeric characters. Keyboard 60 displays, in display area 62, the computer generated characters that were originally displayed in the selected field area 16a. The key areas 64 may be used to insert computer generated characters at a location in the pop-up keyboard display area 62 indicated by a cursor 66.

Additionally, handwritten data may be entered into the pop-up keyboard display area in the same manner as described above for entry of data into field areas 16. The pop-up keyboard is especially useful for entering symbols such as punctuation marks, symbols, and lower-case letters that may not be recognizable by the handwriting recognition algorithm. The Done button 68 is touched to enter the data displayed in the pop-up keyboard display area 62s into the selected field area 16s.

FIG. 4B depicts a numeric pop-up keyboard 60p that pops up in response to tapping a selected field area into which numeric data is to be entered, e.g., field area 16p associated with the "Price" displayed text field. The pop-up display 62p functions in a similar manner to display 62 in the alphanumeric keyboard 60.

During set up appropriate pop-up keyboards are associated with each field area. For example, the alphabetic keyboard 60 depicted in FIG. 4A would be associated with Customer Name field area 16a and the calculator type keyboard 60n depicted in FIG. 4B would be associated with Price field area 16p.

Figure 5:
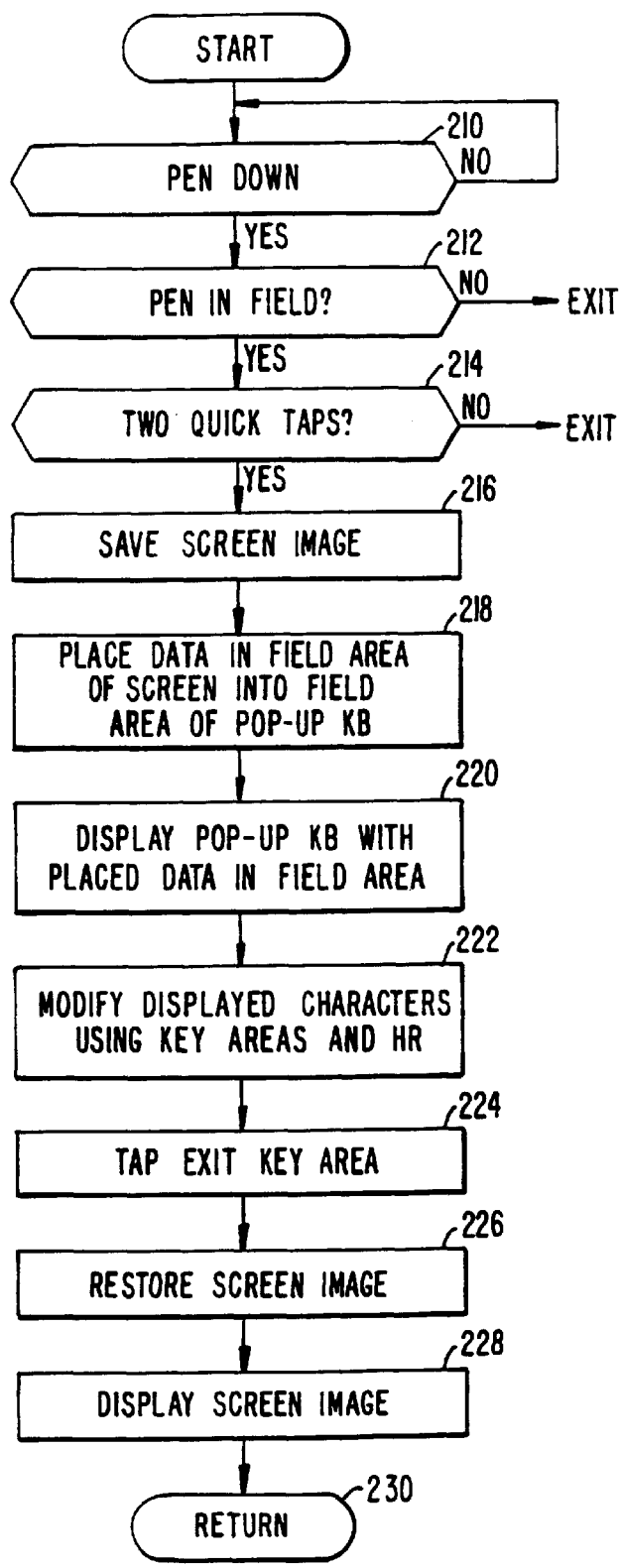
FIG. 5 is a flow-chart illustrating a computer program for implementing a method of utilizing pop-up keyboards to fill in a computer generated form.
Figure 6:
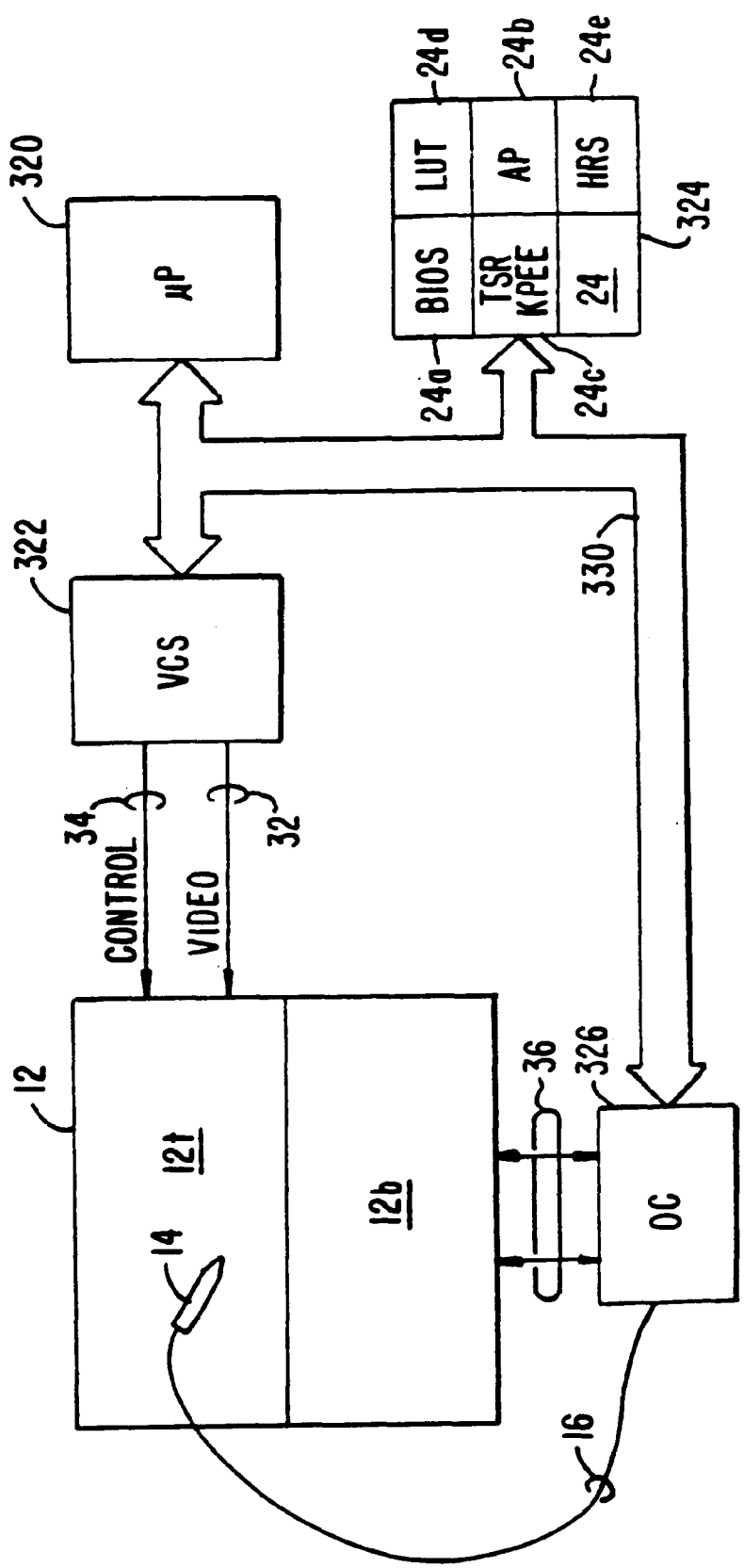
FIG. 6 is a block diagram of a digital system for executing the computer programs for implementing the methods illustrated in FIGS. 3 and 5.

A computer program for implementing the pop-up keyboard data entry method of the present invention is illustrated by the flowchart of FIG. 5. Referring to FIG. 6, the program repeatedly tests 210–214 whether the user indicates that a keyboard for a user-selected field is to be popped-up. In the example, the user taps the selected field twice with the pen.

Once a field is selected, the image displayed on the screen is saved 216 and the data displayed in the selected field area is placed 218 in the field area of the associated pop-up keyboard. The associated pop-up keyboard with the placed data is then displayed 220.

The data displayed in the field area of the pop-up keyboard is then modified utilizing the key areas or by handwriting over the field area as desired by the user. When the user wishes to enter the modified data into the selected field area an exit control area, e.g., the Done button, 66 is touched.

The saved screen area is then restored 226 by placing the modified data from the field area of the associated pop-up keyboard into the selected field area of the saved image.

The restored screen image is then displayed 228 with the modified data from the pop-up keyboard replacing the data previously displayed in the selected field area.

The editing functions that can be invoked in a preferred embodiment utilizing the pointer and handwritten editing symbols will now be briefly described.

Text can be entered into any field in form by writing over the field area. Electronic ink is displayed as the characters are written. The handwritten text is automatically recognized and replaced with "typed" computer generated characters and the electronic ink from the pointer is erased.

Characters are written adjacent to or overlapping existing text are appended to the right of existing text with no intervening space. If characters are written well to the right of existing text then a space is inserted before the new displayed characters.

The editing function of inserting characters between first and second characters in an existing text field will now be briefly described. An insertion bar is invoked by touching the screen between the first and second characters. If the first stroke is a small quick dot in a field then an insertion point is set at the stroke location. Characters to be entered may be written anywhere over the field except over the existing text. When the pointer is held up longer that the predetermined interval the handwritten characters are recognized, computer generated character characters are displayed after the first character, and text starting with the second character is shifted to the right to make room for the inserted characters.

The editing function of deleting characters will now be briefly described. To delete a single character a vertical line is drawn down through the character. The stroke starts above the character and goes down through it. After the character is deleted the insertion bar is displayed to facilitate the editing function of replacing a character with another character. To delete more than one character a horizontal line is drawn through the characters to be deleted.

FIG. 6 is a block diagram of a digital system for implementing the method of filling in forms described herein. In FIG. 6, a control unit 320, e.g. a microprocessor is coupled to a video control system 322, a memory 324, and an overlay controller (OC) 326 by a system bus 330. The memory stores firmware such as BIOS 324a and application programs 324b.

The invention has now been described with reference to a preferred embodiment. Modifications and substitutions will now be apparent to person of ordinary skill in the art. In particular, various configurations of a pop-up keyboard and different patterns for popping-up the keyboard could be utilized. Accordingly, it is not intended to limit the scope of the invention except as provided by the appended claims.

What is claimed is:

1. A method for entering data into a computer having a multi-function screen for displaying images stored in the computer, for sensing screen coordinates selected by a pointer device, and for recognizing a handwritten entry drawn or written on the screen using a pointing device, said method comprising the steps of:

displaying, on the screen, a computer generated image including first and second field areas of predetermined size disposed at predetermined locations on the screen for the entry and display of at least two handwritten characters;

entering at least first and second handwritten characters into said first field by using said pointing device for drawing or writing portions of the at least first and second handwritten characters within said first field area and a portion of at least one of the first and second handwritten characters outside of said first field area;

entering at least third and fourth handwritten characters into said second field area by using said pointing device for drawing or writing portions of the at least third and fourth handwritten characters within said second field area and a portion of at least one of the third and fourth handwritten characters outside of said second field area;

determining screen coordinates of points under the pointing device disposed inside and outside the first field area as the pointing device is used to draw or write the at least first and second handwritten characters;

determining screen coordinates of points under the pointing device disposed inside and outside the second field area as the pointing device is used to draw or write the at least third and fourth handwritten characters;

decoding, using the computer, at least the first and second handwritten characters into corresponding first and second computer generated characters;

decoding using the computer the at least third and fourth handwritten characters entered into corresponding third and fourth computer generated characters;

displaying under control of the computer the first and second computer generated characters in the firs field area; and displaying under control of the computer the third and fourth computer generated characters in the second field area.

2. A method of entering data into a computer having a screen for displaying an image stored in the computer, said method comprising:

displaying, on the screen, a computer generated image, including a first data entry field visually defined by a first boundary and a second data entry field defined by a second boundary for the entry and display of at least two handwritten characters into each of the first and the second data entry fields;

inputting, using a pointer, first and second handwritten characters by drawing the first and second handwritten characters so that a portion of each of the first and second handwritten characters is drawn within the first data entry field and a portion of each of the first and second handwritten characters is drawn outside the first data entry field;

determining pointer coordinates as the first and second handwritten characters are being drawn;

converting, using the computer, the first and second handwritten characters into corresponding first and second computer generated characters based on the pointer coordinates; and displaying the corresponding first and second computer generated characters within the first data entry field boundary.

3. A method according to claim 2, wherein said first boundary is rectangular in shape.

4. A method according to claim 3, wherein said first data entry field is a numeric data field.

5. A method according to claim 3, wherein said first data entry field is an alphabetic data field.

6. A method according to claim 3, wherein said first data entry field is an alphanumeric data entry field and said first and second handwritten characters include alphanumeric data.

7. A method according to claim 3, wherein the first data entry area is configured to receive a customer name.

8. A method according to claim 2, wherein the first and second data entry areas are displayed as part of a computer generated form displayed on the computer screen.

9. A method according to claim 2, wherein the computer executes a program comprising a series of execution phases.

10. A method according to claim 2, wherein inputting said first and second characters includes lifting the pointer from the screen for a minimum amount of time immediately after drawing the first and second characters.

11. A method according to claim 2, wherein inputting said first character includes touching of the screen with said pointer outside of a control area.

12. A method according to claim 2, further comprising drawing in electronic ink the first handwritten character as the first handwritten character is being inputted.

13. A method according to claim 12, wherein said computer generated image includes a first user selectable list.

14. A method according to claim 12, wherein said computer generated image is restored after the pointer is lifted from the screen for a predetermined amount of time.

15. A method according to claim 2, wherein said pointer comprises a pen device movable over said screen.

16. The method according to claim 2, further comprising displaying an electronic ink representation of the first and second handwritten characters as they are drawn or written.

17. The method according to claim 16 further comprising writing or drawing with the pointer a handwritten entry partly within a third data entry field.

18. The method according to claim 17, wherein writing or drawing a handwritten entry partly within said third data entry field further comprises writing a portion of said handwritten entry over a fourth data entry field.

19. The method according to claim 18, further comprising:

digitizing said handwritten entry;

displaying an electronic ink representation of the handwritten entry as the entry is drawn or written;

processing said digitized entry into a corresponding third computer generated symbol; and replacing said electronic ink representation of the handwritten entry with said corresponding third computer generated symbol within said third data entry field.

20. The method according to claim 17, wherein said step of writing or drawing a handwritten entry comprises the step of writing said handwritten entry adjacent to a displayed field name for the third data entry field.

21. The method according to claim 20, further comprising the steps of:

digitizing said handwritten entry;

detecting when the pointer stops touching the screen after said handwritten entry is written or drawn;

measuring, in the computer, a time interval starting when the pointer stops touching the screen;

resetting, in the computer, the time interval when the pointer retouches the screen; and if the time interval exceeds a predetermined duration, processing said digitized handwritten entry into a corresponding computer generated symbol.

22. Apparatus for entering data into a computer, said apparatus comprising:

first storage means for storing an image to be displayed;

display means for displaying said image;

second storage means storing a plurality of field area images, each having a predetermined height and width;

handwriting recognition means for recognizing handwritten entries drawn partly within and partly outside of said at least one of said field areas when said field areas are displayed on a computer screen and for identifying computer generated characters corresponding to the handwritten entries;

input means for inputting handwritten characters;

means for causing display of said corresponding computer generated characters by said display means; and a pointing device for drawing or writing a handwritten entry within and outside of said field areas for entering information into the computer.

23. Apparatus according to claim 22, wherein said input means comprises said pointing device.

24. A computer according to claim 23 arranged to execute a program having a plurality of phases.

25. A computer comprising:

a display for displaying an image;

a memory for storing a plurality of entry field area images configured to receive at least two handwritten characters;

an input device used to input a plurality of handwritten characters drawn partly in and partly outside of the entry field area images displayed on the display;

a handwriting recognition device for recognizing the plurality of handwritten characters drawn partly in and partly outside of the entry field area images and configured to decode the plurality of handwritten characters into corresponding computer generated characters;

a pointing device for writing or drawing with said pointing device a handwritten entry within and outside of said entry field area images for entering information into the computer.

26. A computer according to claim 25 wherein said pointing device comprises a stylus.

27. A computer according to claim 25 arranged to input numeric data into one of the plurality of entry fields.

28. A method for entering data into a computer having a dual function screen for displaying images stored in the computer and for sensing screen coordinates selected by a pointer device, said method comprising:

displaying on the screen a computer generated image including first and second field areas disposed at predetermined locations on the screen for the entry and display of characters, said first field area for entering at least two handwritten characters and said first field area having a first height and a first width, said second field area for entering at least two handwritten characters and said second field area having a second height and a second width;

receiving a first set of at least first and second handwritten characters drawn with the pointer device, wherein a first portion of the first handwritten character is drawn outside first field area and a second portion of the first handwritten character is drawn inside said first field area;

receiving a second set of at least second and third handwritten characters drawn with the pointer device, wherein a third portion of the third handwritten character is drawn outside said second field area and a fourth portion of the third handwritten character is drawn inside said second field area;

digitizing signals representative of said first and second sets of handwritten characters including the first portion, outside the first field area, and the third portion, outside the second field area;

processing in the computer the digitized signals representative of said first and second sets of handwritten characters to identify corresponding computer generated characters;

displaying, in said first field area, the computer generated characters identified as corresponding to the first set handwritten characters; and displaying, in said second field area, the computer generated characters identified as corresponding to the second set handwritten characters.

* * * * *